(12) United States Patent
Jiang

(10) Patent No.: US 12,444,968 B2
(45) Date of Patent: Oct. 14, 2025

(54) CHARGING METHOD AND DEVICE, TERMINAL DEVICE AND COMPUTER READABLE STORAGE MEDIUM

(71) Applicant: BEIJING XIAOMI MOBILE SOFTWARE CO., LTD., Beijing (CN)

(72) Inventor: Pingping Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 832 days.

(21) Appl. No.: 17/703,736

(22) Filed: Mar. 24, 2022

(65) Prior Publication Data

US 2023/0128965 A1    Apr. 27, 2023

(30) Foreign Application Priority Data

Oct. 25, 2021 (CN) .......................... 202111241248.3

(51) Int. Cl.
*H02J 7/00* (2006.01)

(52) U.S. Cl.
CPC .............................. *H02J 7/007192* (2020.01)

(58) Field of Classification Search
CPC .................................................. H02J 7/007192
USPC .......................................................... 320/150
See application file for complete search history.

(56) References Cited

U.S. PATENT DOCUMENTS

| 2015/0137741 | A1  | 5/2015  | Gurries et al. |
| 2019/0089170 | A1  | 3/2019  | Liu et al. |
| 2019/0319478 | A1* | 10/2019 | Zhang ................. H02J 7/00309 |

FOREIGN PATENT DOCUMENTS

| CN | 103972967 A | 8/2014 |
| CN | 106208212 A | 12/2016 |
| CN | 106654424 A | 5/2017 |
| CN | 106898832 A | 6/2017 |
| CN | 108110854 A | 6/2018 |
| CN | 108258348 A | 7/2018 |
| CN | 109193957 A | 1/2019 |
| CN | 110085934 A | 8/2019 |
| CN | 110707772 A | 1/2020 |
| CN | 110767950 A | 2/2020 |
| CN | 112260352 A | 1/2021 |
| CN | 112821508 A | 5/2021 |
| CN | 112909364 A | 6/2021 |
| CN | 113131543 A | 7/2021 |
| CN | 113224822 A | 8/2021 |
| EP | 3340422 A1  | 6/2018 |

(Continued)

OTHER PUBLICATIONS

Extended European Search Report of EP Application No. 22165561.6 dated Nov. 3, 2022, (53p).

(Continued)

*Primary Examiner* — Eric D Lee
(74) *Attorney, Agent, or Firm* — Arch & Lake LLP

(57) ABSTRACT

A charging method includes: determining, by a terminal device, a current heating level of the terminal device in response to detecting that the terminal device is in a charging state; determining a target working mode of a charging integrated circuit of the terminal device based on the current heating level; and adjusting a working mode of the charging integrated circuit from an initial working mode to the target working mode to charge the terminal device through the target working mode.

17 Claims, 7 Drawing Sheets

(56) References Cited

FOREIGN PATENT DOCUMENTS

EP  3672016 A1  6/2020

OTHER PUBLICATIONS

First Search Report issued in CN Application No. 202111241248.3 dated Mar. 28, 2024, (4p).
Zhou Zhijian et al., "A Kind of Field Test Method for Electric Vehicle Charging Pile," Smart Grid, vol. 4 No.4, Apr. 2016 with English translation, (5p).
Wang Taihua et al., "Low temperature charging performance optimization of lithium battery based on BP-PSO Algorithm," Energy Storage Science and Technology, vol. 9 No. 6 Nov. 2020 with English translation, (8p).

* cited by examiner

CHARGING METHOD AND DEVICE, TERMINAL DEVICE AND COMPUTER READABLE STORAGE MEDIUM

CROSS REFERENCE TO RELATED APPLICATION

This application is based upon and claims the priority to Chinese Application No. 2021112412483, filed on Oct. 25, 2021, the content of which is incorporated herein by reference in its entirety for all purposes.

BACKGROUND

With the acceleration of the pace of life of people, the use of a terminal device such as a smart phone is more and more frequent, and the power consumption is accordingly increased, so that it needs to charge the terminal device quickly. However, the problem of battery heating in a rapid charging process of the terminal device is an urgent problem to be solved.

SUMMARY

The disclosure relates to the field of charging techniques, in particular to a charging method and device, terminal device and computer readable storage medium.

According to a first aspect of the examples of the disclosure, provided is a charging method, including: determining, by a terminal device, a current heating level of the terminal device in response to detecting that the terminal device is in a charging state; determining, by the terminal device, a target working mode of a charging integrated circuit of the terminal device based on the current heating level; and adjusting a working mode of the charging integrated circuit from an initial working mode to the target working mode to charge the terminal device through the target working mode.

According to a second aspect of the examples of the disclosure, provided is a terminal device, including: a processor, and a memory configured to store a computer program; when the computer program is executed, the processor is configured to: determine a current heating level of a terminal device in response to detecting that the terminal device is in a charging state; determine a target working mode of a charging integrated circuit of the terminal device based on the current heating level; and adjust a working mode of the charging integrated circuit from an initial working mode to the target working mode so as to charge the terminal device through the target working mode.

According to a third aspect of the examples of the disclosure, provided is a computer readable storage medium having a computer program stored thereon, and when the program is executed by a processor, the processor is configured to: determine a current heating level of a terminal device in response to detecting that the terminal device is in a charging state; determine a target working mode of a charging integrated circuit of the terminal device based on the current heating level; and adjust a working mode of the charging integrated circuit from an initial working mode to the target working mode so as to charge the terminal device through the target working mode.

It should be understood that the above general description and the following detailed description are exemplary and explanatory only and are not intended to limit the disclosure.

BRIEF DESCRIPTION OF THE DRAWINGS

The drawings herein are incorporated into and constitute part of the description, illustrating examples conforming to the disclosure, and used together with the description to interpret the principles of the disclosure.

DETAILED DESCRIPTION

Figure 1:
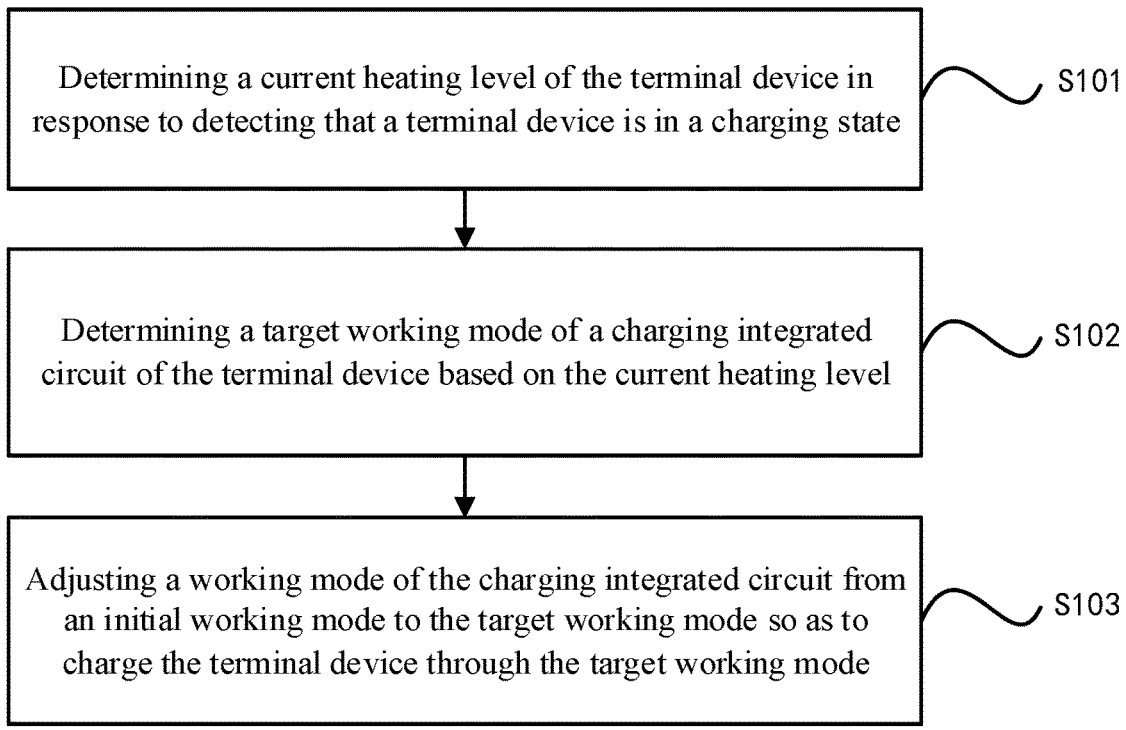
FIG. 1 is a flow chart of a charging method shown according to one illustrative example of the disclosure.

Illustrative examples will be described in detail here, examples of which are represented in the drawings. When the following description involves drawings, the same numbers in different drawings represent the same or similar elements unless otherwise indicated. Examples described in the following illustrative examples do not represent all examples consistent with the disclosure. Instead, they are examples of devices and methods consistent with some aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Battery heating in a rapid charging process of a terminal device is a problem. In order to solve the problem, a solution in the related technology is usually that when serious heating of the terminal device is detected, a charging current is gradually reduced according to a temperature level until charging is stopped. However, according to the solution, the charging efficiency of the terminal device can be reduced, and then the user experience is affected. In order to solve the problems existing in the related technology, examples of the disclosure provide a charging method and device, a terminal device and a computer readable storage medium below to overcome the above defects in the related technology.

FIG. 1 is a flow chart of a charging method shown according to one illustrative example; the method provided by this example can be applied to a terminal device (such as a smart phone, a tablet personal computer, wearable equipment and the like) supporting a charging function.

As shown in FIG. 1, the method includes the following steps of S101 to S103:

in the step S101, a current heating level of the terminal device is determined in response to detecting that a terminal device is in a charging state.

In this example, the current heating level of the terminal device is determined in response to detecting that the terminal device is in the charging state by the terminal device.

For example, after a user inserts a charger into a terminal device, whether the terminal device is connected with the charger, i.e., whether the charger is inserted into the terminal device, can be determined by the terminal device. After the charger is inserted into the terminal device, it can be determined that the terminal device is in the charging state, and then the current heating level of the terminal device can be determined when it is determined that the terminal device is in the charging state. It can be understood that after whether the terminal device is connected with the charger or not is determined, in order to ensure the safety of the charging process of the terminal device, whether a current charger is a standard charger or not can also be detected by the terminal device, and then when it is determined that the current charger is the standard charger, a working mode of high-power charging (such as 'an initial working mode' mentioned in the subsequent step S103) is started. On this basis, when it is detected that the terminal device is in the charging state, the current heating level of the terminal device can be determined. It can be understood that the standard charger is a charger adapted to the terminal device. When it is determined that the current charger is not the standard charger, the terminal device cannot use the working mode of high-power charging, and the charging efficiency at the moment is lower than that when the charger is the standard charger.

In one example, the terminal device can detect whether the charger is inserted into the terminal device or not by detecting whether a charging interface is occupied or not, which is not limited in this example. It can be understood that the charging method in the examples of the disclosure is also suitable for a wireless charging scene.

In one example, the current heating level of the terminal device can be used for representing the current heating degree of the terminal device. For example, when a heating determinant of the terminal device is determined, such as information on a current temperature of the terminal device and/or an application scene where the terminal device is located, the heating determinant can be matched with each predetermined heating level of the terminal device, so that the heating level matched with the heating determinant is determined as the current heating level of the terminal device.

In another example, the mode for determining the current heating level of the terminal device can also refer to the example shown in the following FIG. 2, and will not be described in detail here.

In the step S102, a target working mode of a charging integrated circuit of the terminal device is determined based on the current heating level.

In this example, after the current heating level of the terminal device is determined in response to detecting that the terminal device is connected with a charger for charging, the target working mode of the charging integrated circuit (namely, charging IC) of the terminal device can be determined based on the current heating level.

For example, after the current heating level of the terminal device is determined, a working mode (namely, a target working mode) corresponding to the current heating level can be determined based on a pre-constructed corresponding relation between each heating level and a working mode of the charging integrated circuit. For example, a corresponding relation between a heating level 1 and a working mode A, a corresponding relation between a heating level 2 and a working mode B, . . . , a corresponding relation between a heating level i and a working mode N and the like can be constructed in advance; and when the current heating level of the terminal device is determined to be 'the heating level 2', the target working mode of the charging integrated circuit of the terminal device can be determined to be 'the working mode B' based on the corresponding relations.

In the step S103, a working mode of the charging integrated circuit is adjusted from an initial working mode to the target working mode.

In this example, after the target working mode of the charging integrated circuit of the terminal device is determined based on the current heating level, if the initial working mode of the charging integrated circuit is detected to be different from the target working mode, the working mode of the charging integrated circuit is adjusted from the initial working mode to the target working mode. In this example, the initial working mode of the charging integrated circuit is a working mode of the charging integrated circuit which is not adjusted, namely, a current working mode of the charging integrated circuit when the current heating level of the terminal device is determined.

For example, under the condition that the initial working mode is different from the target working mode, the initial working mode of the charging integrated circuit of the terminal device can be a Switching mode, while the target working mode of the charging integrated circuit of the terminal device can be a Bypass mode.

In the Switching mode, a voltage of a charger and a voltage of a battery are in a 2:1 relation, and a charging current output by the charger and a current reaching a battery end are in a 1:2 relation. For example, if a current voltage of the battery is 4V, the voltage of the charger is about 8V, and if the current output by the charger is 6 A, the current reaching the battery end is 12 A after passing through the charging IC; as the voltage of the battery rises, the voltage of the charger also rises, and the maximum voltage of the battery is 4.5 V, so the maximum output voltage of the Switching mode is about 10 V, and a relation of about two times is kept.

In the Bypass mode, the voltage of the charger and the voltage of the battery differ by one voltage difference, for example, the voltage of the battery is 4V, and the voltage of the charger is about 4.2 V, so that the voltage difference is about 0.2 V, and the lowest voltage of the battery is about 3.6 V, and the lowest output voltage of the charger in the Bypass mode is about 3.6 V; the voltage difference between the voltage of the charger and the voltage of the battery is determined according to a current set for charging, so that in the Bypass mode, the voltage and the current output by the charger and the voltage and current reaching the battery end are basically in a 1:1 relation.

In contrast, the charging efficiency of the Switching mode is about 90%, and the charging efficiency of the Bypass mode is about 95%; the Switching mode is embodied in saving cost and power, for example, in a charging solution in the related technology, the Bypass mode is high in efficiency, the maximum current input to a battery is slightly lower than that of the Switching mode, but higher efficiency and slightly lower power mean that heating is smaller, and as a voltage output by a charger in the Bypass mode is smaller than a voltage output by a charger in the Switching mode, heating caused by voltage reduction is transferred to a charger end; and the voltage output by the charger in the Switching mode needs to be further reduced through the charging IC, and loss caused by energy conversion exists in this process, which is output in a heat mode, and is embodied in that the heating of the terminal device is more serious. In this example, the working mode of the charging integrated circuit is adjusted from the Switching mode to the Bypass mode, so that loss caused by energy conversion can be reduced by reducing the charging current and the output voltage, the heating degree of the terminal device is further reduced, the problem of heating in the charging process of the terminal device is effectively solved, and the solution of 'gradually reducing the charging current according to the temperature level until charging is stopped' in the related technology does not need to be adopted, so that the terminal device can be prevented from stopping charging, the charging efficiency of the terminal device can be ensured, and the user experience is improved.

It can be understood that when the initial working mode of the terminal device is a high-power charging mode, for example, when the initial working mode is a Switching mode, a maximum charging current in the target working mode is smaller than a maximum charging current in the initial working mode, and an output voltage in the target working mode is smaller than an output voltage in the initial working mode.

It can be seen from the above description that in the method provided by this example, the current heating level of the terminal device is determined in response to detecting that the terminal device is in the charging state, and the target working mode of the charging integrated circuit of the terminal device is determined based on the current heating level; then the working mode of the charging integrated circuit is adjusted from the initial working mode to the target working mode, so as to charge the terminal device through the target working mode; and the target working mode of the charging integrated circuit of the terminal device is accurately determined based on the current heating level of the terminal device, so that the working mode of the charging integrated circuit is adjusted from the initial working mode to the target working mode. The problem of heating in the charging process of the terminal device can be effectively solved by adjusting the working mode, the terminal device can be prevented from stopping charging, the charging efficiency of the terminal device can be ensured, and the user experience is improved.

Figure 2:
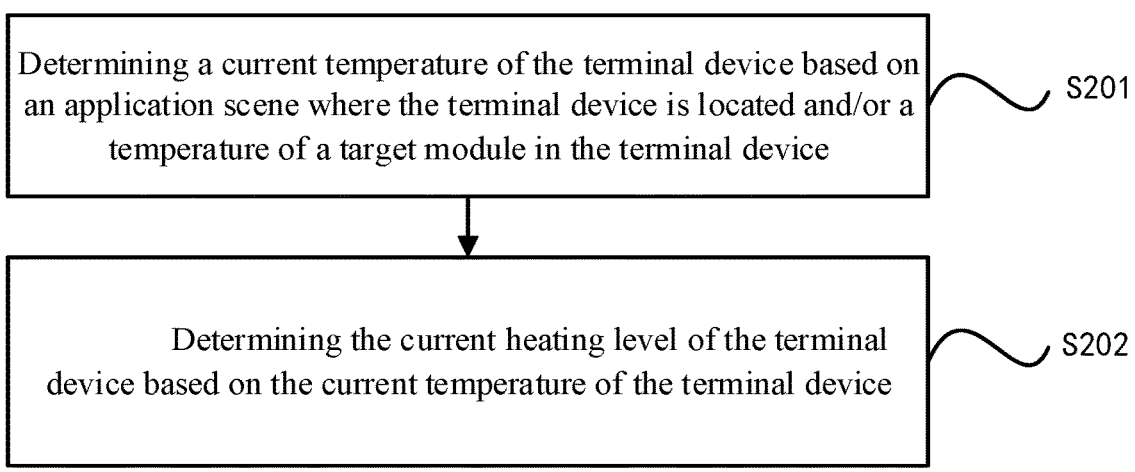
FIG. 2 is a flow chart of how to determine a current heating level of the terminal device shown according to one illustrative example of the disclosure.

FIG. 2 is a flow chart of how to determine a current heating level of the terminal device shown according to one illustrative example of the disclosure; in this example, on the basis of the above example, how to determine the current heating level of the terminal device is taken as an example for exemplified description. As shown in FIG. 2, the step of determining the current heating level of the terminal device in the step S101 can include the following steps of S201-S202:

in the step S201, a current temperature of the terminal device is determined based on an application scene where the terminal device is located or a temperature of a target component in the terminal device.

In this example, when the terminal device detects that the terminal device is in a charging state, the application scene where the terminal device is located or the temperature of the target component in the terminal device can be obtained, where the target component can include the charging integrated circuit and a module used by the application scene.

The application scene where the terminal device is located can be set based on actual needs, such as an screen off charging scene, a game charging scene and an online video charging scene, which is not limited in this example.

In one example, in order to obtain the current temperature of the terminal device, the temperature of the charging IC of the terminal device and the temperature of the module used by the application scene can be collected, for example, the temperature of the charging IC and the temperature of a graphics processing unit (GPU) can be collected in the game charging scene and the online video charging scene; and the temperature of the charging IC and the temperature of a camera component can be collected in the charging scene of photographing and video recording.

Further, after the application scene where the terminal device is located or the temperature of the target component in the terminal device are/is obtained, the current temperature of the terminal device can be determined, for example, the temperature of each target component is subjected to weighted calculation, so that the current temperature of the terminal device is obtained.

By taking a situation that the current temperature of the terminal device is determined according to the application scene where the terminal device is located and the temperature of the target component in the terminal device as an example, under the condition that the application scene where the terminal device is located is the game charging scene, when a user plays a mobile phone game on the terminal device while charging, the temperature T1 of a CPU, the temperature T2 of a GPU and the temperatures T3 and T4 of two charging ICs can be collected, and then the current temperature T of the terminal device is calculated based on the following formula (1):

$$T=T1*k1+T2*k2+T3*k3+T4*k4; \tag{1}$$

where k1, k2, k3 and k4 are weights corresponding to T1, T2, T3 and T4 respectively, values can be set based on actual needs, for example, the values are all set to be 25%, which is not limited in this example.

It can be understood that the selected target component in the game charging scene is the CPU, the GPU and the two charging ICs used for description. As the target component includes the charging integrated circuit and the module used by the application scene, when the application scene where the terminal device is located is different, the selected target component used for determining the current temperature of the terminal device can also be different. In one example, when the types and the numbers of the selected target components are different, the temperature of each target component can be subjected to weighted calculation, so that the current temperature of the terminal device is obtained, and the adopted formula is similar to the formula (1), namely, the current temperature can be the sum of the products of the temperatures of the target components and the weights.

By taking a situation that the current temperature of the terminal device is determined according to the temperature of the target component in the terminal device as an example, when it is detected that the terminal device is in a charging state, the temperatures of the multiple preset target components in the terminal device can be obtained, and then weighted calculation can be carried out on the temperatures of the multiple target components, so that the current temperature of the terminal device is obtained, and the adopted formula is also similar to the formula (1), namely, the current temperature can be the sum of the products of the temperatures of the multiple target components and the respective weights.

By taking a situation that the current temperature of the terminal device is determined according to the application scene where the terminal device is located as an example, the application scene where the terminal device is located can be determined by detecting the type of an application program running on the terminal device, such as an screen off charging scene, a game charging scene and an online video charging scene. Then, a duration of the terminal device in the current application scene can be detected, and then the duration can be matched with historical data obtained in advance to obtain the current temperature of the terminal device. The historical data can include a corresponding relation between the duration of the terminal device in the current application scene and the historical temperature of the terminal device. It can be understood that although the determined current temperature of the terminal device under the condition is an estimated value instead of a real value, the estimated value can reflect the current heating condition of the terminal device to a certain extent, which can be used for determining the current heating level of the terminal device in subsequent steps. If it is detected that the terminal device is currently located in two or more application scenes, a current temperature can be separately determined based on a duration of the terminal device in each scene, and then the current temperature of the terminal device can be determined according to a highest current temperature, or the current temperature corresponding to each scene is weighted, and a value obtained by weighting is determined as the current temperature of the terminal device.

In the step S202, the current heating level of the terminal device is determined based on the current temperature of the terminal device.

In this example, after the current temperature of the terminal device is determined based on the application scene and the temperature of the target component, the current heating level of the terminal device can be determined based on the current temperature of the terminal device.

By still taking the above mobile phone game charging scene as an example, after the weighted temperature T is calculated, a temperature level corresponding to the temperature T, namely the current temperature level of the terminal device, can be found in a predefined two-dimensional relation table of a temperature and a temperature level.

It can be seen from the above description that in this example, the current temperature of the terminal device is determined based on the application scene where the terminal device is located or the temperature of the target component in the terminal device, and then the current heating level of the terminal device is determined based on the current temperature of the terminal device, so that the current heating level of the terminal device can be accurately determined, the target working mode of the charging integrated circuit of the terminal device can be subsequently determined based on the current heating level, and the working mode of the charging integrated circuit is adjusted from the initial working mode to the target working mode, so as to charge the terminal device through the target working mode, so that the problem of heating in the charging process of the terminal device can be effectively solved, the terminal device is prevented from stopping charging, the charging efficiency of the terminal device can be ensured, and the user experience can be improved.

Figure 3:
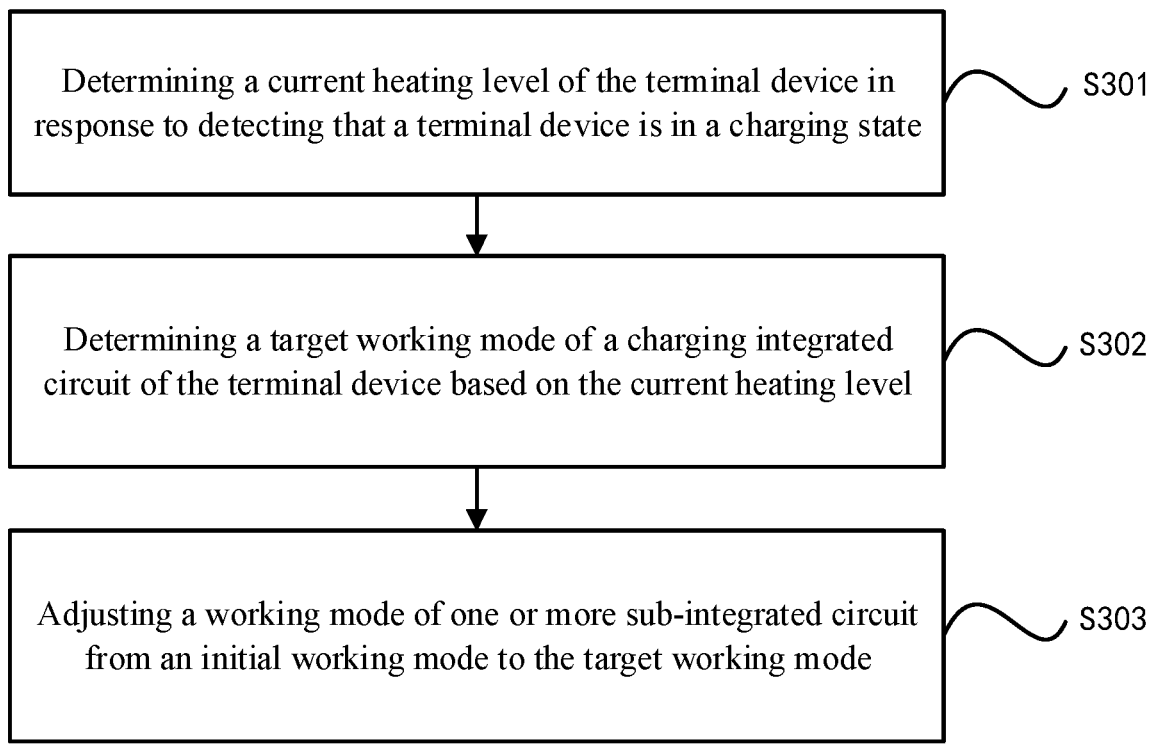
FIG. 3 is a flow chart of another charging method shown according to one illustrative example of the disclosure.

FIG. 3 is a flow chart of another charging method shown according to one illustrative example of the disclosure; the method provided by this example can be applied to a terminal device (such as a smart phone, a tablet personal computer, wearable equipment and the like) supporting a charging function. In this example, the charging integrated circuit can include at least two sub-integrated circuits.

As shown in FIG. 3, the method includes the following steps of S301-S303:

in the step S301, in response to detecting a terminal device is in a charging state, a current heating level of the terminal device is determined.

In the step S302, a target working mode of a charging integrated circuit of the terminal device is determined based on the current heating level.

The related explanation and description of the steps S301-S302 can refer to the steps S101-S102 in the example shown in the FIG. 1, which will not be repeated here.

In the step S303, a working mode of one or more sub-integrated circuit is adjusted from an initial working mode to the target working mode.

In this example, after the target working mode of the charging integrated circuit of the terminal device is determined based on the current heating level, the working mode of one or more sub-integrated circuit in the integrated circuit can be adjusted from the initial working mode to the target working mode.

For example, if a terminal device is provided with two sub-integrated circuits (such as two charging ICs), after the target working mode of the charging integrated circuits of the terminal device is determined based on the current heating level, a working mode of one or two of the two charging ICs can be adjusted from an initial working mode to the target working mode.

The working mode of one or two of the two charging ICs can be adjusted from a Switching mode to a Bypass mode, and the explanation and the description of the Switching mode and the Bypass mode can refer to the example shown in the FIG. 1, which will not be repeated here. By adjusting the working mode of one or two of the two charging ICs from the initial working mode to the target working mode, the loss caused by energy conversion can be reduced in a mode of reducing the charging current and the output voltage, so that the heating degree of the terminal device is reduced, the problem of heating in the charging process of the terminal device is effectively solved, the terminal device can be prevented from stopping charging, the charging efficiency of the terminal device can be ensured, and the user experience is improved. It is worthy of being explained that the initial working mode of the one or more sub-integrated circuit is a Switching mode used for explanation. In practical application, the initial working mode of the one or more sub-integrated circuit can also be a mode except the Switching mode, which is not limited in this example.

Figure 4:
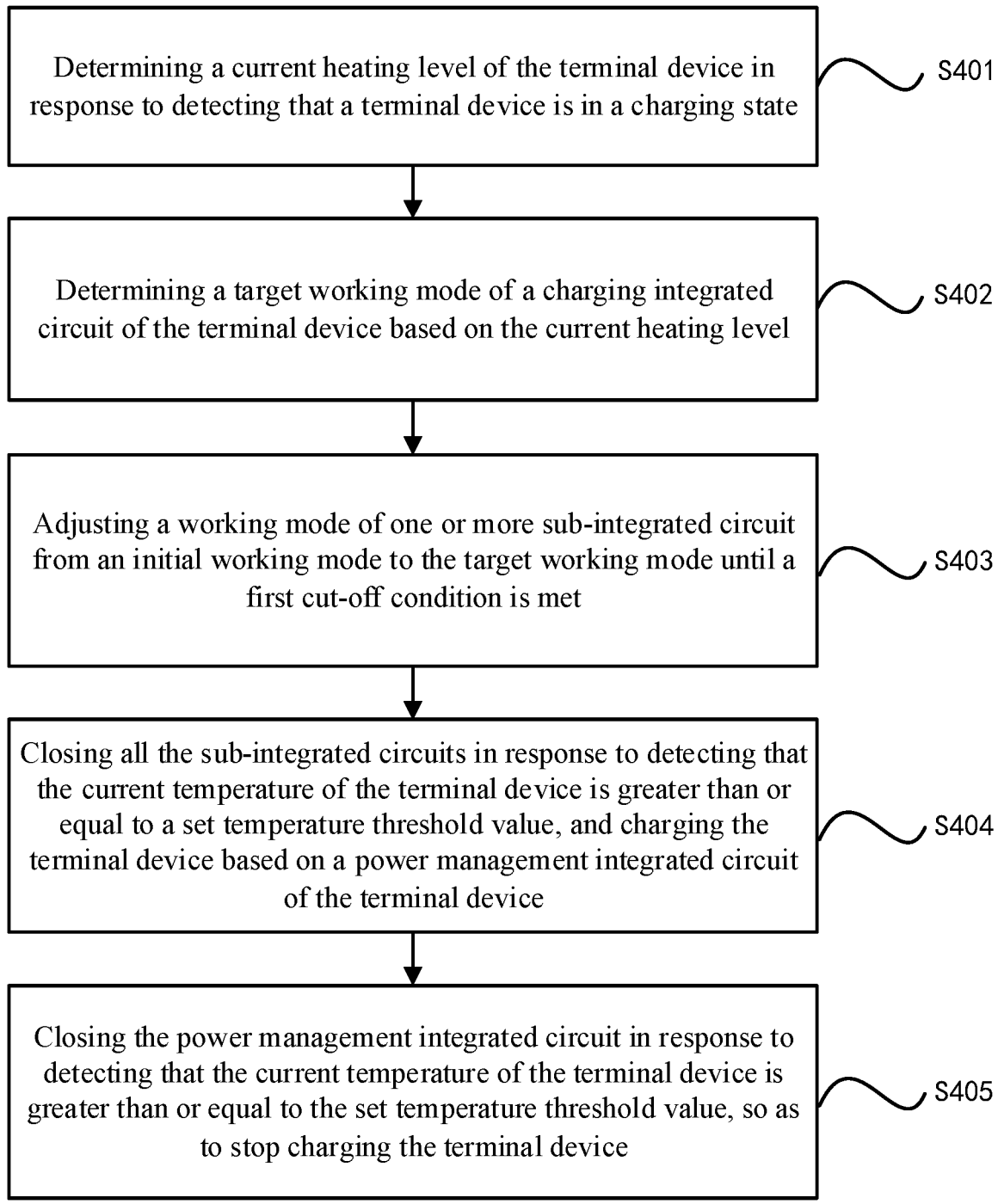
FIG. 4 is a flow chart of another charging method shown according to one illustrative example of the disclosure.

FIG. 4 is a flow chart of another charging method shown according to one illustrative example of the disclosure; the method provided by this example can be applied to a terminal device (such as a smart phone, a tablet personal computer, wearable equipment and the like) supporting a charging function.

As shown in FIG. 4, the method includes the following steps of S401-S403; optionally, the method may further include S404-S405:

in the step S401, in response to detecting a terminal device is in a charging state, a current heating level of the terminal device is determined.

In the step S402, a target working mode of a charging integrated circuit of the terminal device is determined based on the current heating level.

The related explanation and description of the steps S401-S402 can refer to the steps S101-S102 in the example shown in the FIG. 1, which will not be repeated here.

In the step S403, a working mode of one or more sub-integrated circuit is adjusted from an initial working mode to the target working mode until a first cut-off condition is met.

In this example, after the target working mode of the charging integrated circuit of the terminal device is determined based on the current heating level, the working mode of one or more sub-integrated circuit can be adjusted from the initial working mode to the target working mode until the first cut-off condition is met, where the first cut-off condition may include one or more of (1) and (2):

(1) detecting that a current temperature of the terminal device is smaller than a set temperature threshold; or (2) detecting that working modes of all sub-integrated circuits of the charging integrated circuit are adjusted from initial working modes to the target working mode.

For example, it is assumed that the terminal device is provided with two sub-integrated circuits (such as two charging ICs), after the target working mode of the charging integrated circuits of the terminal device is determined based on the current heating level, a working mode of one of the two charging ICs can be adjusted from an initial working mode to the target working mode, and then whether the first cut-off condition is met or not is determined, that is, whether the current temperature of the terminal device is detected to be smaller than the set temperature threshold value or whether the working modes of all the sub-integrated circuits are adjusted from the initial working modes to the target working mode or not is determined.

Further, if the first cut-off condition is met, a working mode of the remaining charging IC in the two charging ICs is not continuously adjusted; on the contrary, if the first cut-off condition is not met, a working mode of one charging IC in the remaining charging ICs is continuously adjusted from an initial working mode to the target working mode until the first cut-off condition is met.

In the step S404, in response to detecting that the current temperature of the terminal device is greater than or equal to a set temperature threshold value, all the sub-integrated circuits are closed, and the terminal device is charged based on a power management integrated circuit of the terminal device.

In this example, in response to detecting that the working modes of all sub-integrated circuits of the terminal device are adjusted from the initial working modes to the target working mode, all the sub-integrated circuits can be closed when the current temperature of the terminal device is detected to be greater than or equal to the set temperature threshold value; and the terminal device is charged based on the power management integrated circuit (PMIC) of the terminal device, so that the terminal device is charged through relatively small current, and the current temperature of the terminal device is prevented from continuing to rise.

By still taking the condition that an initial working mode can be a Switching mode, and a target working mode can be a Bypass mode as an example, when the working modes of all sub-integrated circuits of the terminal device are adjusted from the Switching mode to the Bypass mode, whether the current temperature of the terminal device is higher than or equal to the set temperature threshold value or not can be detected again at a set frequency; and when the current temperature is detected to be greater than or equal to the set temperature threshold value, all sub-integrated circuits are closed, switching to the PMIC of the terminal device to carry out low-current charging.

In the step S405, in response to detecting that the current temperature of the terminal device is greater than or equal to the set temperature threshold value, the power management integrated circuit is closed so as to stop charging the terminal device.

It can be understood that if it is still detected that whether the current temperature of the terminal device is higher than or equal to the set temperature threshold value or not under the condition of switching to the PMIC to carry out low-current charging, the power management integrated circuit can be closed to stop charging the terminal device, and the charging safety of the terminal device can be guaranteed.

Figure 5:
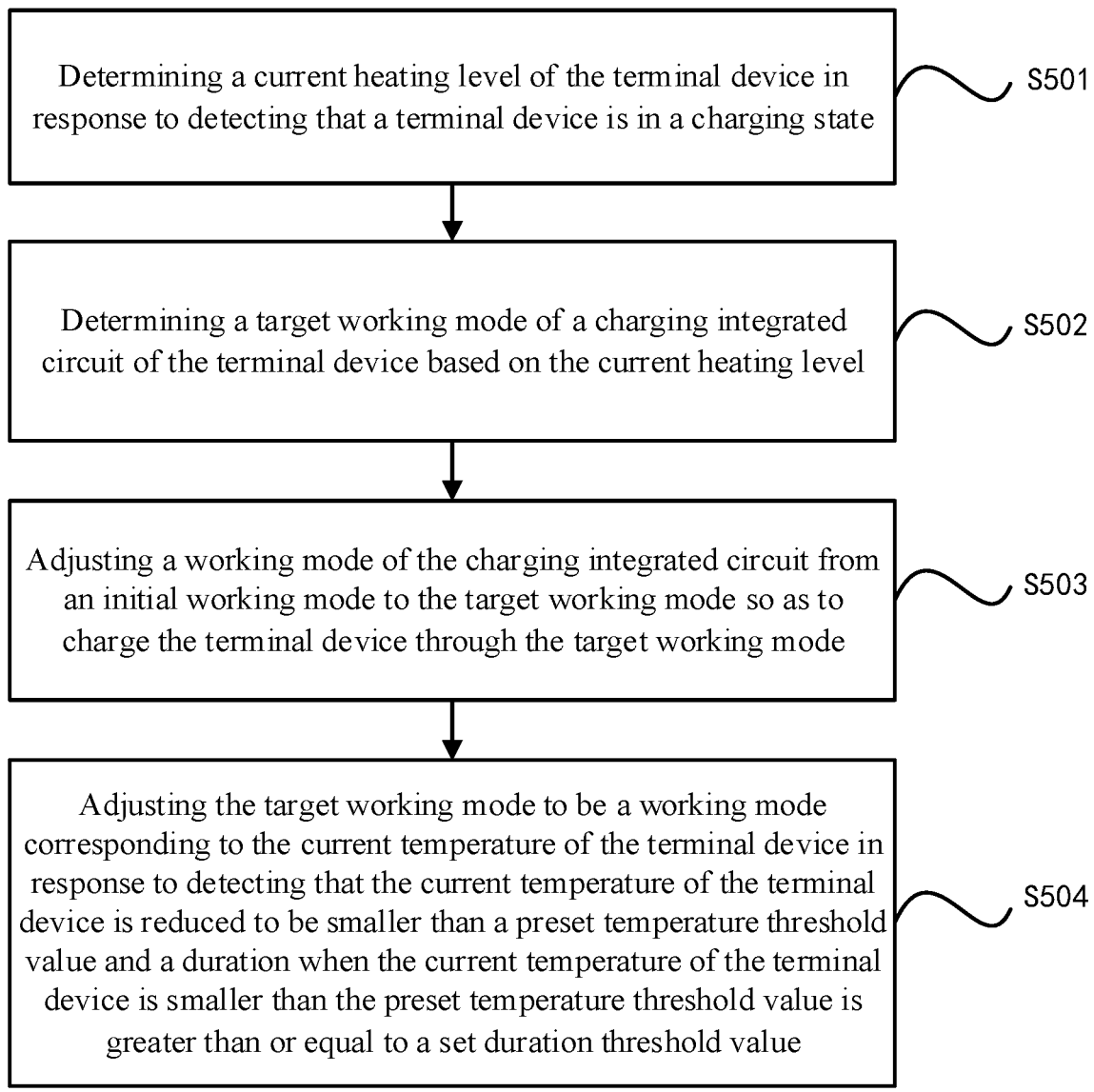
FIG. 5 is a flow chart of another charging method shown according to one illustrative example of the disclosure.

FIG. 5 is a flow chart of another charging method shown according to one illustrative example of the disclosure; the method provided by this example can be applied to a terminal device (such as a smart phone, a tablet personal computer, wearable equipment and the like) supporting a charging function.

As shown in FIG. 5, the method includes the following steps of S501 to S504:

in the step S501, in response to detecting a terminal device is in a charging state, a current heating level of the terminal device is determined.

In the step S502, a target working mode of a charging integrated circuit of the terminal device is determined based on the current heating level.

In the step S503, a working mode of the charging integrated circuit is adjusted from an initial working mode to the target working mode, so as to charge the terminal device through the target working mode.

The related explanation and description of the steps S501-S503 can refer to the steps S101-S103 in the example shown in the FIG. 1, which will not be repeated here.

In the step S504, in response to detecting that the current temperature of the terminal device is reduced to be smaller than a preset temperature threshold value, and a duration when the current temperature of the terminal device is smaller than the preset temperature threshold value is greater than or equal to a set duration threshold value, the target working mode is adjusted to be a working mode corresponding to the current temperature of the terminal device.

In this example, after the working mode of the charging integrated circuit is adjusted from the initial working mode to the target working mode, whether the current temperature of the terminal device is reduced to be smaller than the preset temperature threshold value or not can be detected again at a set frequency; if it is detected that the current temperature of the terminal device is reduced to be smaller than the preset temperature threshold value, and the duration when the current temperature is smaller than the preset temperature threshold value is greater than or equal to the set duration threshold value, the working mode of the charging integrated circuit can be adjusted from the target working mode to the working mode corresponding to the current temperature of the terminal device, so that the rapid charging of the terminal device is guaranteed, the problem of heating in the charging process of the terminal device is solved, and the terminal device stops charging is prevented from stopping charging; the charging efficiency of the terminal device is ensured, and the user experience is improved. It can be understood that the working mode corresponding to the current temperature may be the initial working mode, or the current temperature of the terminal device may be lower than the temperature of the terminal device in the initial working mode and higher than the temperature of the terminal device in the target working mode.

Figure 6:
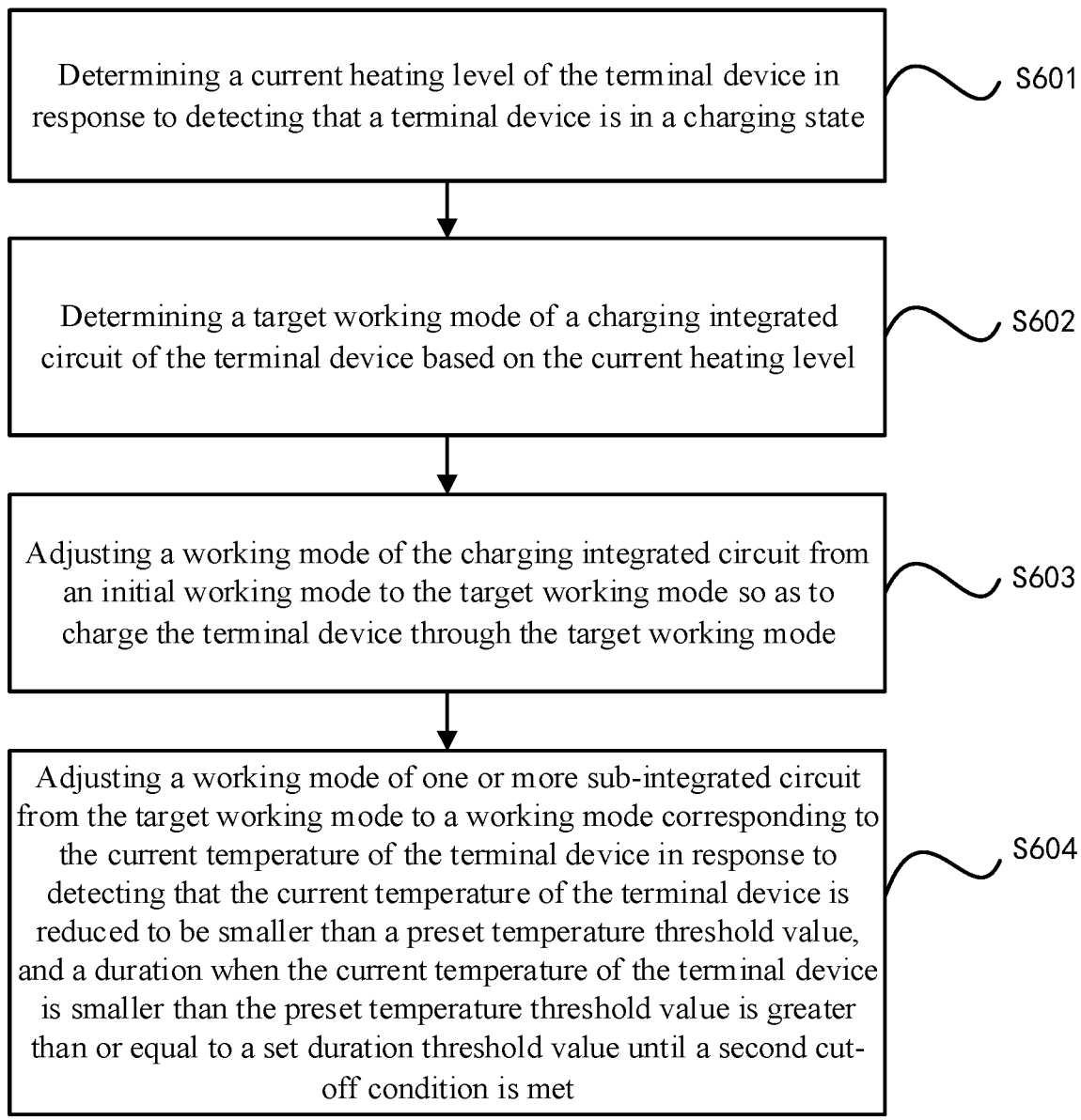
FIG. 6 is a flow chart of another charging method shown according to one illustrative example of the disclosure.

FIG. 6 is a flow chart of another charging method shown according to one illustrative example of the disclosure; the method provided by this example can be applied to a terminal device (such as a smart phone, a tablet personal computer, wearable equipment and the like) supporting a charging function. In this example, the charging integrated circuit includes at least two sub-integrated circuits.

As shown in FIG. 6, the method includes the following steps of S601 to S604:

in the step S601, in response to detecting a terminal device is in a charging state, a current heating level of the terminal device is determined.

In the step S602, a target working mode of a charging integrated circuit of the terminal device is determined based on the current heating level.

In the step S603, a working mode of the charging integrated circuit is adjusted from an initial working mode to the target working mode, so as to charge the terminal device through the target working mode.

The related explanation and description of the steps S601-S603 can refer to the steps S101-S103 in the example shown in the FIG. 1, which will not be repeated here.

In the step S604, in response to detecting that the current temperature of the terminal device is reduced to be smaller than a preset temperature threshold value, and a duration when the current temperature of the terminal device is smaller than the preset temperature threshold value is greater than or equal to a set duration threshold value, a working mode of one or more sub-integrated circuit is adjusted from the target working mode to a working mode corresponding to the current temperature of the terminal device until a second cut-off condition is met.

in this example, when it is detected that the current temperature of the terminal device is reduced to be smaller than the preset temperature threshold value and the duration when the current temperature of the terminal device is smaller than the preset temperature threshold value is greater than or equal to the set duration threshold value, the working mode of one or more sub-integrated circuit can be adjusted from the target working mode to the working mode corresponding to the current temperature of the terminal device until the second cut-off condition is met, and the second cut-off condition can include one or more of (i) and (ii):
 (i) detecting that the current temperature of the terminal device is higher than or equal to the set temperature threshold value; or
 (ii) detecting that working modes of all sub-integrated circuits of the charging integrated circuit are adjusted from the target working mode to initial working modes.

For example, if a terminal device is provided with two sub-integrated circuits (such as two charging ICs), whether the current temperature of the terminal device is reduced to be smaller than a preset temperature threshold value or not can be detected after the working modes of the two charging ICs are adjusted from the initial working modes to the target working mode; after it is detected that the current temperature of the terminal device is reduced to be smaller than the preset temperature threshold value, and the duration when the current temperature of the terminal device is smaller than the preset temperature threshold value is greater than or equal to a set duration threshold value, a working mode of one of the two charging ICs can be adjusted from the target working mode (such as a Bypass mode) to the working mode corresponding to the current temperature of the terminal device, and then whether the second cut-off condition is met or not is determined, that is, whether the current temperature of the terminal device is detected to be higher than or equal to the set temperature threshold value or whether the working modes of all sub-integrated circuits are adjusted from the target working mode to the initial working modes (such as a Switching mode) or not is determined. It can be understood that under the condition that the terminal device is provided with two sub-integrated circuits, the initial working mode can be that the two sub-integrated circuits are both in a Switching mode.

Further, if the second cut-off condition is met, a working mode of the remaining charging IC in the two charging ICs is not continuously adjusted; on the contrary, if the second cut-off condition is not met, a working mode of one charging IC in the remaining charging ICs is continuously adjusted from the target working mode to the working mode corresponding to the current temperature of the terminal device until the second cut-off condition is met. The working mode of the terminal device of each charging IC can be dynamically switched based on the current temperature of the terminal device, the fast charging of the terminal device is realized to the greatest extent, the charging efficiency of the terminal device is improved, and the user experience is further improved.

In general, according to the examples of the disclosure, the current temperature level of the terminal device is determined according to the application scene and the current temperature of the terminal device in severe power utilization charging scenes such as a game playing charging scene or a video watching charging scene, so that a working mode of each charging IC is dynamically adjusted according to the temperature level, for example, a switching mode of one of the charging ICs is switched to a Bypass mode; if heating cannot be improved or a use load of the terminal device is increased at the moment, the Switching mode of a second charging IC is continued to be switched to the Bypass mode; then, when the temperature of the terminal device is reduced to be below a set temperature threshold value and lasts for a period of time, the Bypass mode of each charging IC is gradually switched to the Switching mode, so that the performance of playing games or watching videos of the terminal device can be played to the maximum extent, meanwhile, high-power fast charging can be ensured, the charging efficiency of the terminal device can be ensured, that is, fast charging can be realized, games can be played or videos can be watched smoothly, and the heating condition of the terminal device can be improved.

Figure 7:
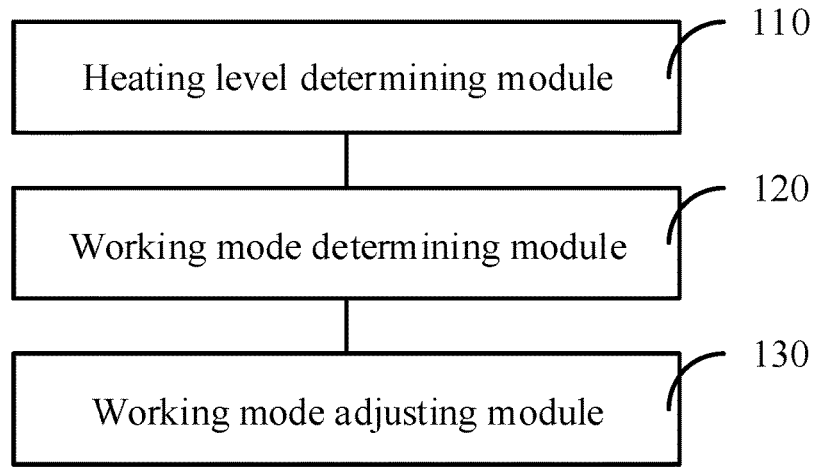
FIG. 7 is a block diagram of a charging device shown according to one illustrative example of the disclosure.

FIG. 7 is a block diagram of a charging device shown according to one illustrative example of the disclosure; the device provided by this example can be applied to a terminal device (such as a smart phone, a tablet personal computer, wearable equipment and the like) supporting a charging function. As shown in FIG. 7, the device includes a heating level determining module 110, a working mode determining module 120 and a working mode adjusting module 130, where:

the heating level determining module 110 is configured to determine a current heating level of the terminal device in response to detecting that a terminal device is in a charging state;

the working mode determining module 120 is configured to determine a target working mode of a charging integrated circuit of the terminal device based on the current heating level; and the working mode adjusting module 130 is configured to adjust a working mode of the charging integrated circuit from an initial working mode to the target working mode so as to charge the terminal device through the target working mode.

It can be seen from the above description that in the device provided by this example, the current heating level of the terminal device is determined in response to detecting that the terminal device is in the charging state, and the target working mode of the charging integrated circuit of the terminal device is determined based on the current heating level; then the working mode of the charging integrated circuit is adjusted from the initial working mode to the target working mode, so as to charge the terminal device through the target working mode; and the target working mode of the charging integrated circuit of the terminal device is accurately determined based on the current heating level of the terminal device, so that the working mode of the charging integrated circuit is adjusted from the initial working mode to the target working mode. The problem of heating in the charging process of the terminal device can be effectively solved by adjusting the working mode, the terminal device can be prevented from stopping charging, the charging efficiency of the terminal device can be ensured, and the user experience is improved.

Figure 8:
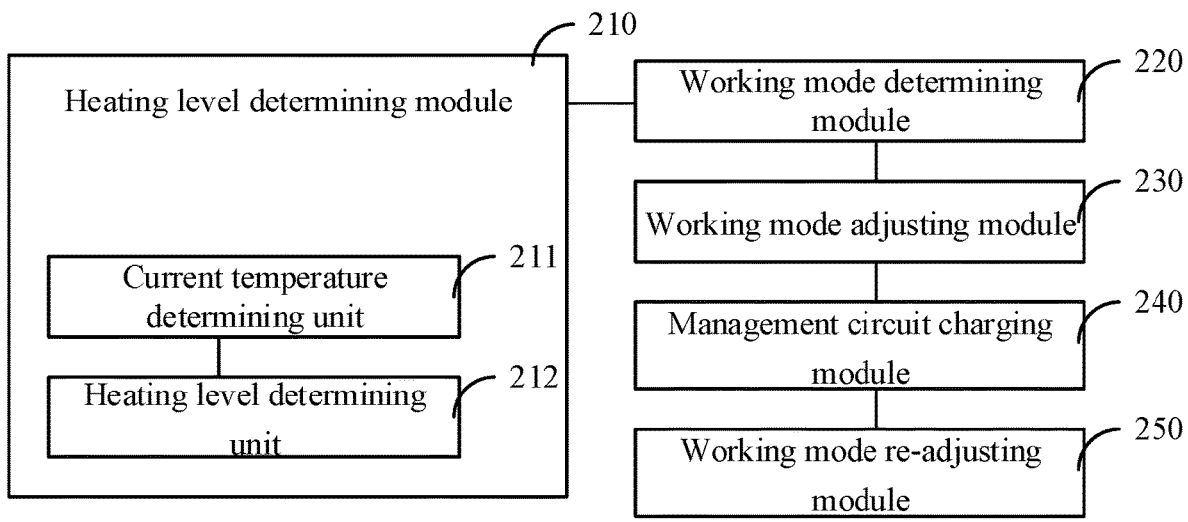
FIG. 8 is a block diagram of another charging device shown according to one illustrative example of the disclosure.

FIG. 8 is a block diagram of another charging device shown according to one illustrative example of the disclosure; the device provided by this example can be applied to a terminal device (such as a smart phone, a tablet personal computer, wearable equipment and the like) supporting a charging function. The functions of a heating level determining module 210, a working mode determining module 220 and a working mode adjusting module 230 are the same as those of the heating level determining module 110, the working mode determining module 120 and the working mode adjusting module 130 in the example shown in FIG. 7, which will not be repeated here. As shown in FIG. 8, the heating level determining module 210 can further include:

a current temperature determining unit 211, configured to determine a current temperature of the terminal device based on an application scene where the terminal device is located or a temperature of a target component in the terminal device, where the target component includes the charging integrated circuit and a module used by the application scene; and a heating level determining unit 212, configured to determine the current heating level of the terminal device based on the current temperature of the terminal device.

In one example, the charging integrated circuit may include at least two sub-integrated circuits;

Correspondingly, the working mode adjusting module 230 can also be configured to adjust a working mode of one or more sub-integrated circuit from an initial working mode to the target working mode.

In one example, the working mode adjusting module 230 can also be configured to adjust the working mode of the one or more sub-integrated circuit from the initial working mode to the target working mode until a first cut-off condition is met, where the first cut-off condition at least includes one of the following conditions: detecting that the current temperature of the terminal device is smaller than a set temperature threshold value; or detecting that working modes of all sub-integrated circuits of the charging integrated circuit are adjusted from the initial working modes to the target working mode.

In one example, in response to detecting that the working modes of all the sub-integrated circuits are adjusted from the initial working modes to the target working mode, the device can further include:

a management circuit charging module 240, configured to close all the sub-integrated circuits in response to detecting that the current temperature of the terminal device is greater than or equal to a set temperature threshold value, and charge the terminal device based on a power management integrated circuit of the terminal device.

In one example, the management circuit charging module 240 can also be configured to close the power management integrated circuit in response to detecting that the current temperature of the terminal device is greater than or equal to a set temperature threshold value, so as to stop charging the terminal device.

In one example, the device may also include:

a working mode re-adjusting module 250, configured to adjust the target working mode to be a working mode corresponding to the current temperature of the terminal device in response to detecting that the current temperature of the terminal device is reduced to be smaller than a preset temperature threshold value and a duration when the current temperature of the terminal device is smaller than the preset temperature threshold value is greater than or equal to a set duration threshold value.

In one example, the charging integrated circuit may include at least two sub-integrated circuits;

correspondingly, the working mode re-adjusting module 250 may further configured to adjust a working mode of one or more sub-integrated circuit from the target working mode to the working mode corresponding to the current temperature of the terminal device until a second cut-off condition is met, where the second cut-off condition at least includes one of the following conditions: detecting that the current temperature of the terminal device is greater than or equal to the set temperature threshold value; or detecting that working modes of all sub-integrated circuits of the charging integrated circuit are adjusted from the target working mode to the initial working modes.

According to the device in the examples, a mode for each module to execute operation has been described in detail in the examples of the method, and will not be described in detail here.

Figure 9:
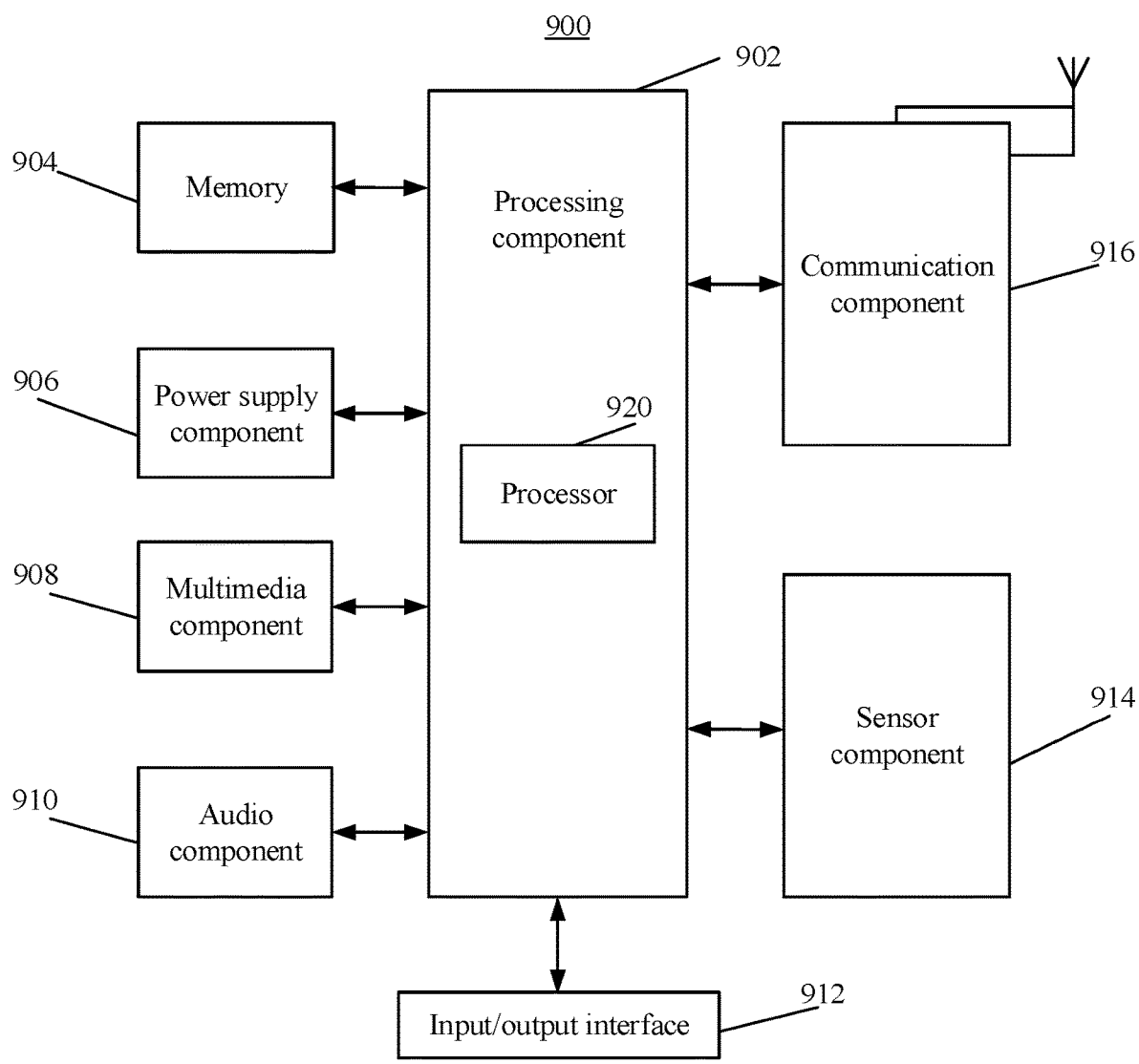
FIG. 9 is a block diagram of a terminal device shown according to one illustrative example of the disclosure.

FIG. 9 is a block diagram of a terminal device shown according to one illustrative example. For example, a device 900 may be a mobile phone, a computer, a digital broadcasting terminal, a messaging device, a game console, a tablet device, a medical device, a fitness device, a personal digital assistant, or the like.

With reference to FIG. 9, the device 900 may include one or more of the following components: a processing component 902, a memory 904, a power supply component 906, a multimedia component 908, an audio component 910, an input/output (I/O) interface 912, a sensor component 914, and a communication component 916.

The processing component 902 typically controls overall operations of the device 900, such as operations associated with display, telephone calls, data communications, camera operations, and recording operations. The processing component 902 may include one or more processors 920 to execute instructions to complete all or part of the steps of the above method. Further, the processing component 902 may include one or more modules for facilitating the interaction between the processing component 902 and other components. For example, the processing component 902 may include a multimedia module to facilitate the interaction between the multimedia component 908 and the processing component 902.

The memory 904 is configured to store various types of data to support operation at the device 900. Examples of these data include instructions, contact data, phonebook data, messages, pictures, videos, etc. for any application or method operating on the device 900. The memory 904 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 906 provides power for various components of the device 900. The power supply component 906 may include a power management system, one or more power supplies, and other components associated with generating, managing, and distributing power for the device 900.

The multimedia component 908 includes a screen arranged between the device 900 and a user and used for providing an output interface. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touches, slides, and gestures on the touch panel. The touch sensor may not only sense boundaries of a touch or slide action, but also detect duration and pressure associated with the touch or slide action. In some examples, the multimedia component 908 includes a front camera and/or a rear camera. When the device 900 is in an operating mode, such as a shooting mode or a video mode, the front camera and/or the rear camera can receive external multimedia data. Each front camera and each rear camera can be a fixed optical lens system or have focal length and optical zoom capability.

The audio component 910 is configured to output and/or input an audio signal. For example, the audio component 910 includes a microphone (MIC) configured to receive an external audio signal when the device 900 is in an operating mode, such as a call mode, a recording mode, and a voice recognition mode. The received audio signal may be further stored in the memory 904 or transmitted via the communication component 916. In some examples, the audio component 910 also includes a speaker for outputting the audio signal.

The I/O interface 912 provides an interface between the processing component 902 and a peripheral interface module, and the peripheral interface module may be a keyboard, a click wheel, a button and the like. These buttons may include, but are not limited to, a home button, a volume button, a start button, and a lock button.

The sensor component 914 includes one or more sensors for providing various aspects of state evaluation for the device 900. For example, the sensor assembly 914 can detect an on/off state of the device 900, relative positioning of the components, such as a display and keypad of the device 900, and can also detect a change in position of the device 900 or one of the components of the device 900, the presence or absence of user contact with the device 900, or the orientation or acceleration/deceleration of the device 900 and the temperature change of the device 900. The sensor component 914 may also include a proximity sensor configured to detect the presence of a nearby object without any physical contact. The sensor component 914 may also include a light sensor, such as a CMOS or CCD image sensor, for use in imaging applications. In some examples, the sensor component 914 may also include an acceleration sensor, a gyroscope sensor, a magnetic sensor, a pressure sensor, or a temperature sensor.

The communication component 916 is configured to facilitate wired or wireless communication between the device 900 and other devices. The device 900 may access a wireless network based on a communication standard, such as WiFi, 2G or 3G, 4G or 5G, or a combination of them. In one illustrative example, the communication component 916 receives broadcast signals or broadcast related information from an external broadcast management system via a broadcast channel. In one illustrative example, the communication component 916 also includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In illustrative examples, the device 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above method.

In illustrative examples, a non-transitory computer-readable storage medium including instructions is also provided, such as a memory 904 including instructions, and the instructions are executable by a processor 920 of the device 900 to complete the above method. For example, the non-transitory computer-readable storage medium may be an ROM, a random access memory (RAM), a CD-ROM, a magnetic tape, a floppy disk, an optical data storage device, or the like.

Other examples of the disclosure will be readily conceived after taking into account the description and practicing the disclosure disclosed herein by those skilled in the art. The disclosure is directed to encompassing any variation, use or adaptive variation of the disclosure that follow the general principles of the disclosure and include known common knowledge or habitual technical means in the art that are not disclosed by the disclosure. The description and examples are considered only exemplary, and the true scope and spirit of the disclosure are indicated by the following claims.

It should be understood that the disclosure is not limited to the precise structures that have been described above and shown in the drawings, and various modifications and changes can be made without departing from the scope of the disclosure. The scope of the present disclosure is limited only by the appended claims.

EXAMPLES

1. A charging method, including:
  determining a current heating level of the terminal device in response to detecting that a terminal device is in a charging state;
  determining a target working mode of a charging integrated circuit of the terminal device based on the current heating level; and
  adjusting a working mode of the charging integrated circuit from an initial working mode to the target working mode so as to charge the terminal device through the target working mode.

2. The method of example 1, where determining the current heating level of the terminal device includes:
  determining a current temperature of the terminal device based on an application scene where the terminal device is located or a temperature of a target component in the terminal device, where the target component includes the charging integrated circuit and a module used by the application scene; and
  determining the current heating level of the terminal device based on the current temperature of the terminal device.

3. The method of example for 2, where the charging integrated circuit includes at least two sub-integrated circuits;
  adjusting the working mode of the charging integrated circuit from the initial working mode to the target working mode includes:
  adjusting a working mode of one or more sub-integrated circuit from an initial working mode to the target working mode.

4. The method of example 3, where adjusting the working mode of the one or more sub-integrated circuit from the initial working mode to the target working mode includes:
  adjusting the working mode of the one or more sub-integrated circuit from the initial working mode to the target working mode until a first cut-off condition is met, where the first cut-off condition at least includes one of following conditions: detecting that the current temperature of the terminal device is smaller than a set temperature threshold value; or detecting that working modes of all sub-integrated circuits of the charging integrated circuit are adjusted from initial working modes to the target working mode.

5. The method of example 4, where in response to detecting that the working modes of all the sub-integrated circuits are adjusted from the initial working modes to the target working mode, the method further includes:
  closing all the sub-integrated circuits in response to detecting that the current temperature of the terminal device is greater than or equal to the set temperature threshold value, and charging the terminal device based on a power management integrated circuit of the terminal device.

6. The method of example 5, where after closing all the sub-integrated circuits, and charging the terminal device based on the power management integrated circuit of the terminal device, the method further includes:
  closing the power management integrated circuit in response to detecting that the current temperature of the terminal device is greater than or equal to the set temperature threshold value, so as to stop charging the terminal device.

7. The method of any of examples 1-6, further including:
  adjusting the target working mode to be a working mode corresponding to the current temperature of the terminal device in response to detecting that the current temperature of the terminal device is reduced to be smaller than a preset temperature threshold value and a duration when the current temperature of the terminal device is smaller than the preset temperature threshold value is greater than or equal to a set duration threshold value.

8. The method of example 7, where the charging integrated circuit incudes at least two sub-integrated circuits;
  adjusting the target working mode to be the working mode corresponding to the current temperature of the terminal device includes:
  adjusting a working mode of one or more sub-integrated circuit from the target working mode to the working mode corresponding to the current temperature of the terminal device until a second cut-off condition is met, where the second cut-off condition at least includes one of the following conditions: detecting that the current temperature of the terminal device is greater than or equal to the set temperature threshold value; or detecting that working modes of all sub-integrated circuits of the charging integrated circuit are adjusted from the target working mode to initial working modes.

9. A charging device, including:
  a heating level determining module, configured to determine a current heating level of the terminal device in response to detecting that a terminal device is in a charging state;
  a working mode determining module, configured to determine a target working mode of a charging integrated circuit of the terminal device based on the current heating level; and
  a working mode adjusting module, configured to adjust a working mode of the charging integrated circuit from an initial working mode to the target working mode to charge the terminal device through the target working mode.

10. The device of example 9, where the heating level determining module includes:
  a current temperature determining unit, configured to determine a current temperature of the terminal device based on an application scene where the terminal device is located or a temperature of a target component in the terminal device, where the target component includes the charging integrated circuit and a module used by the application scene; and
  a heating level determining unit, configured to determine the current heating level of the terminal device based on the current temperature of the terminal device.

11. The device of example 9 or 10, where the charging integrated circuit includes at least two sub-integrated circuits;

the working mode adjusting module is further configured to adjust a working mode of one or more sub-integrated circuit from an initial working mode to the target working mode.

12. The device of example 11, where the working mode adjusting module is further configured to adjust the working mode of the one or more sub-integrated circuit from the initial working mode to the target working mode until a first cut-off condition is met, where the first cut-off condition at least includes one of the following conditions: detecting that the current temperature of the terminal device is smaller than a set temperature threshold value; or detecting that working modes of all sub-integrated circuits of the charging integrated circuit are adjusted from initial working modes to the target working mode.

13. The device of any of examples 9-12, further including:
a working mode re-adjusting module, configured to adjust the target working mode to be a working mode corresponding to the current temperature of the terminal device in response to detecting that the current temperature of the terminal device is reduced to be smaller than a preset temperature threshold value and a duration when the current temperature of the terminal device is smaller than the preset temperature threshold value is greater than or equal to a set duration threshold value.

14. The device of example 13, where the charging integrated circuit includes at least two sub-integrated circuits;
the working mode re-adjusting module is further configured to adjust a working mode of one or more sub-integrated circuit from the target working mode to the working mode corresponding to the current temperature of the terminal device until a second cut-off condition is met, where the second cut-off condition at least includes one of the following conditions: detecting that the current temperature of the terminal device is greater than or equal to the set temperature threshold value; or detecting that working modes of all sub-integrated circuits of the charging integrated circuit are adjusted from the target working mode to the initial working modes.

15. A terminal device, including:
a processor, and a memory configured to store a computer program;
where the processor is configured to implement the charging method according to any of examples 1-8 when the computer program is executed.

16. A non-transitory computer readable storage medium having a computer program stored thereon, where when the program is executed by a processor, the charging method according to any of examples 1-8 is implemented.

What is claimed is:

1. A charging method, comprising:
determining, by a terminal device, a current heating level of the terminal device in response to detecting that the terminal device is in a charging state;
determining, by the terminal device, a target working mode of a charging integrated circuit of the terminal device based on the current heating level; and
adjusting a working mode of the charging integrated circuit from an initial working mode to the target working mode to charge the terminal device through the target working mode;
wherein determining the current heating level of the terminal device comprises:
determining a current temperature of the terminal device based on an application scene where the terminal device is located or a temperature of a target component in the terminal device, wherein the target component comprises the charging integrated circuit and a module used by the application scene, wherein the application scene where the terminal device is located is determined according to a type of an application program running on the terminal device; and
determining the current heating level of the terminal device based on the current temperature of the terminal device.

2. The method according to claim 1, wherein the charging integrated circuit comprises at least two sub-integrated circuits; and wherein
adjusting the working mode of the charging integrated circuit from the initial working mode to the target working mode comprises:
adjusting a working mode of one or more sub-integrated circuit from an initial working mode to the target working mode.

3. The method according to 2, wherein adjusting the working mode of the one or more sub-integrated circuit from the initial working mode to the target working mode comprises:
adjusting the working mode of the one or more sub-integrated circuit from the initial working mode to the target working mode until a first cut-off condition is met, wherein the first cut-off condition comprises at least one of following conditions:
detecting that the current temperature of the terminal device is smaller than a set temperature threshold value; or
detecting that working modes of all sub-integrated circuits of the charging integrated circuit are adjusted from initial working modes to the target working mode.

4. The method according to claim 3, wherein in response to detecting that the working modes of all the sub-integrated circuits are adjusted from the initial working modes to the target working mode, the method further comprises:
closing all the sub-integrated circuits in response to detecting that the current temperature of the terminal device is greater than or equal to the set temperature threshold value, and charging the terminal device based on a power management integrated circuit of the terminal device.

5. The method according to claim 4, wherein after closing all the sub-integrated circuits, and charging the terminal device based on the power management integrated circuit of the terminal device, the method further comprises:
closing the power management integrated circuit in response to detecting that the current temperature of the terminal device is greater than or equal to the set temperature threshold value, to stop charging the terminal device.

6. The method according to claim 1, further comprising:
adjusting the target working mode to be a working mode corresponding to the current temperature of the terminal device in response to detecting that the current temperature of the terminal device is reduced to be smaller than a preset temperature threshold value and a duration when the current temperature of the terminal device is smaller than the preset temperature threshold value is greater than or equal to a set duration threshold value.

7. The method according to claim 6, wherein the charging integrated circuit comprises at least two sub-integrated circuits; and wherein adjusting the target working mode to be the working mode corresponding to the current temperature of the terminal device comprises:
  adjusting a working mode of one or more sub-integrated circuit from the target working mode to the working mode corresponding to the current temperature of the terminal device until a second cut-off condition is met, wherein the second cut-off condition comprises at least one of following conditions:
  detecting that the current temperature of the terminal device is greater than or equal to the set temperature threshold value; or
  detecting that working modes of all sub-integrated circuits of the charging integrated circuit are adjusted from the target working mode to initial working modes.

8. A terminal device, comprising:
  a processor, and a memory configured to store a computer program;
  when the computer program is executed, the processor is configured to:
  determine a current heating level of a terminal device in response to detecting that the terminal device is in a charging state;
  determine a target working mode of a charging integrated circuit of the terminal device based on the current heating level; and
  adjust a working mode of the charging integrated circuit from an initial working mode to the target working mode to charge the terminal device through the target working mode;
  wherein the processor is further configured to:
  determine a current temperature of the terminal device based on an application scene where the terminal device is located or a temperature of a target component in the terminal device, wherein the target component comprises the charging integrated circuit and a module used by the application scene, wherein the application scene where the terminal device is located is determined according to a type of an application program running on the terminal device; and
  determine the current heating level of the terminal device based on the current temperature of the terminal device.

9. The terminal device according to claim 8, wherein the charging integrated circuit comprises at least two sub-integrated circuits; and wherein
  the processor is configured to:
  adjust a working mode of one or more sub-integrated circuit from an initial working mode to the target working mode.

10. The terminal device according to claim 9, the processor is configured to:
  adjust the working mode of the one or more sub-integrated circuit from the initial working mode to the target working mode until a first cut-off condition is met, wherein the first cut-off condition comprises at least one of following conditions:
  detecting that the current temperature of the terminal device is smaller than a set temperature threshold value; or
  detecting that working modes of all sub-integrated circuits of the charging integrated circuit are adjusted from initial working modes to the target working mode.

11. The terminal device according to claim 10, the processor is configured to:
  in response to detecting that the working modes of all the sub-integrated circuits are adjusted from the initial working modes to the target working mode, close all the sub-integrated circuits in response to detecting that the current temperature of the terminal device is greater than or equal to the set temperature threshold value, and charging the terminal device based on a power management integrated circuit of the terminal device.

12. The terminal device according to claim 11, the processor is configured to:
  after closing all the sub-integrated circuits, and charging the terminal device based on the power management integrated circuit of the terminal device, close the power management integrated circuit in response to detecting that the current temperature of the terminal device is greater than or equal to the set temperature threshold value, to stop charging the terminal device.

13. The terminal device according to claim 8, the processor is configured to:
  adjust the target working mode to be a working mode corresponding to the current temperature of the terminal device in response to detecting that the current temperature of the terminal device is reduced to be smaller than a preset temperature threshold value and a duration when the current temperature of the terminal device is smaller than the preset temperature threshold value is greater than or equal to a set duration threshold value.

14. The terminal device according to claim 13, wherein the charging integrated circuit comprises at least two sub-integrated circuits; and wherein
  the processor is configured to:
  adjust the target working mode to be the working mode corresponding to the current temperature of the terminal device comprises:
  adjust a working mode of one or more sub-integrated circuit from the target working mode to the working mode corresponding to the current temperature of the terminal device until a second cut-off condition is met, wherein the second cut-off condition comprises at least one of following conditions:
  detecting that the current temperature of the terminal device is greater than or equal to the set temperature threshold value; or
  detecting that working modes of all sub-integrated circuits of the charging integrated circuit are adjusted from the target working mode to initial working modes.

15. A non-transitory computer readable storage medium having a computer program stored thereon, wherein when the program is executed by a processor, the processor is configured to:
  determine a current heating level of a terminal device in response to detecting that the terminal device is in a charging state;
  determine a target working mode of a charging integrated circuit of the terminal device based on the current heating level; and
  adjust a working mode of the charging integrated circuit from an initial working mode to the target working mode to charge the terminal device through the target working mode;
  wherein the processor is further configured to:
  determine a current temperature of the terminal device based on an application scene where the terminal device is located or a temperature of a target component in the terminal device, wherein the target component comprises the charging integrated circuit and a module used by the application scene, wherein the application scene where the terminal device is located is determined according to a type of an application program running on the terminal device; and determine the current heating level of the terminal device based on the current temperature of the terminal device.

16. The non-transitory computer readable storage medium according to claim 15, wherein the charging integrated circuit comprises at least two sub-integrated circuits; and wherein the processor is configured to:

adjust a working mode of one or more sub-integrated circuit from an initial working mode to the target working mode.

17. The non-transitory computer readable storage medium according to claim 16, the processor is configured to:

adjust the working mode of the one or more sub-integrated circuit from the initial working mode to the target working mode until a first cut-off condition is met, wherein the first cut-off condition comprises at least one of following conditions:

detecting that the current temperature of the terminal device is smaller than a set temperature threshold value; and detecting that working modes of all sub-integrated circuits of the charging integrated circuit are adjusted from initial working modes to the target working mode.

* * * * *